United States Patent [19]

Amstutz et al.

[11] 4,033,127
[45] July 5, 1977

[54] HYDRAULICALLY-POWDERED VEHICLE ACCESSORY SYSTEM SUPERCHARGED BY HYDRAULIC VEHICLE DRIVE SYSTEM

[75] Inventors: Jacob Amstutz; Paul G. Amstutz, both of Canby, Oreg.

[73] Assignee: Jacob Amstutz, Canby, Oreg.

[22] Filed: June 4, 1976

[21] Appl. No.: 692,949

[52] U.S. Cl. .................................. 60/455; 60/464; 60/484; 60/486
[51] Int. Cl.² .................... F15B 13/06; F15B 13/09
[58] Field of Search ............ 60/420, 455, 456, 464, 60/484, 486

[56] References Cited

UNITED STATES PATENTS

| | | | |
|---|---|---|---|
| 3,396,536 | 8/1968 | Miller et al. | 60/455 X |
| 3,646,596 | 2/1972 | Bauer | 60/455 X |
| 3,916,767 | 11/1975 | Barton | 60/486 X |

*Primary Examiner*—Edgar W. Geoghegan
*Attorney, Agent, or Firm*—Chernoff & Vilhauer

[57] ABSTRACT

A hydraulic system for mobile industrial equipment wherein the wheels or tracks of the mobile equipment are driven by a hydraulic transmission system having an engine-driven pump assembly, and wherein the hydraulic accessories mounted on the equipment are powered by a separate engine-driven hydraulic pump which draws its fluid from the hydraulic transmission pump assembly, and particularly the charge pump component thereof.

3 Claims, 1 Drawing Figure

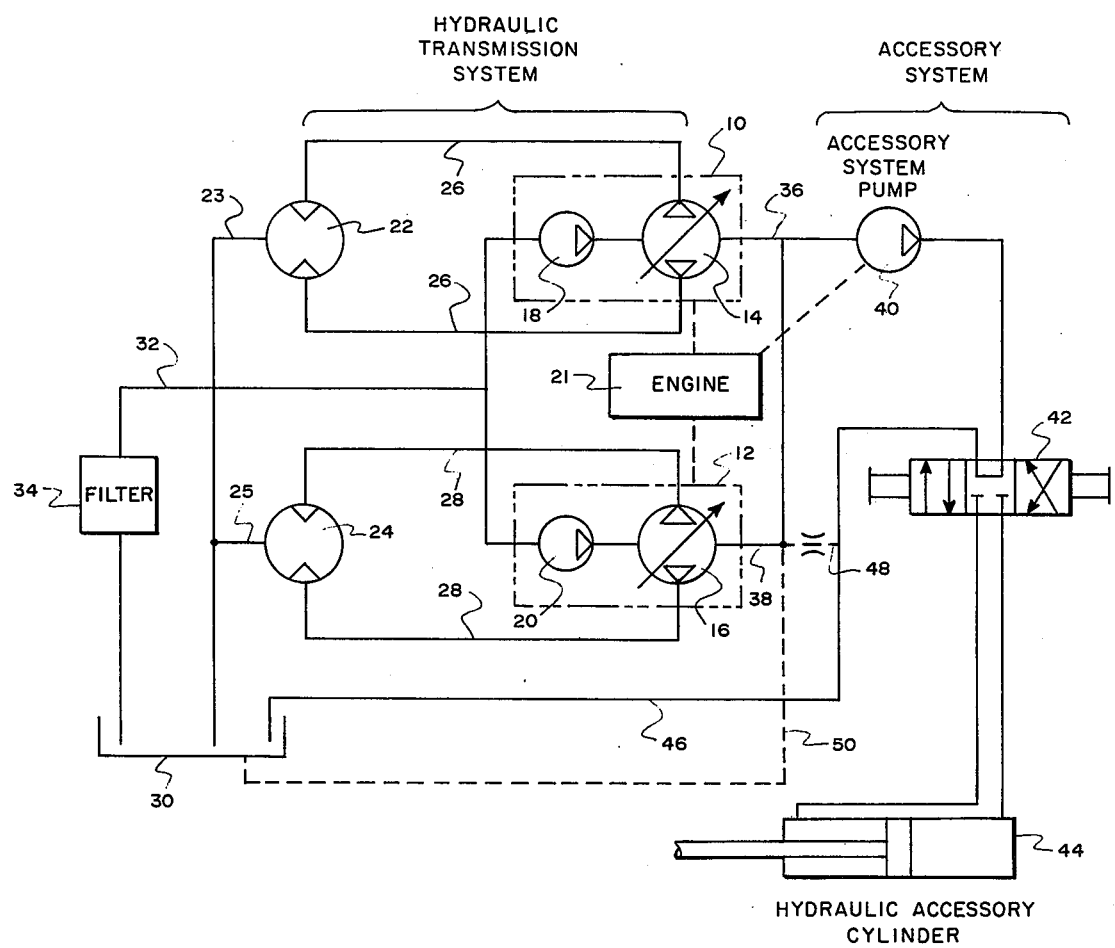

HYDRAULICALLY-POWDERED VEHICLE ACCESSORY SYSTEM SUPERCHARGED BY HYDRAULIC VEHICLE DRIVE SYSTEM

BACKGROUND OF THE INVENTION

This invention relates to improvements in mobile equipment having hydraulic transmission systems and hydraulically-powered accessory systems.

In the past, such mobile equipment have utilized a hydraulic transmission system usually comprising one or more variable displacement hydrostatic pumps powering one or more fixed or variable displacement hydrostatic motors through a closed, recirculating fluid conduit loop or loops. The variable displacement pumps are driven by the vehicle engine, and the hydrostatic motors drive wheels or tracks as the case may be. Each such hydrostatic pump conventionally also includes a fixed displacement charge pump also driven by the engine, to make up any leakage in the closed loop circuit and thereby prevent any cavitation in the system. Such charge pumps are designed to produce a volumetric flow much in excess of the needs of the hydraulic transmission system, such excess normally being exhausted from the system through a pump case drain to the main hydraulic fluid reservoir, from which the charge pump draws its fluid through a sump line and filter.

Such mobile vehicles, especially those used for industrial purposes such as excavating equipment, cranes and forklift trucks, usually also include extensive hydraulic-powered accessory systems such as hydraulic cylinder-operated excavating blades and buckets, crane booms, lifting masts and so forth. These accessories are conventionally powered by pressurized hydraulic fluid received from a separate engine-driven pump, normally of the fixed displacement type, which draws its hydraulic fluid through a separate sump line and filter from the same central fluid reservoir from which the hydraulic transmission system draws its fluid, and returns the fluid to the sump through a separate sump return line.

The above-described conventional hydraulic transmission and hydraulic accessory systems are unduly wasteful in several respects. The need for separate filters, separate sump lines and separate sump return lines for the hydraulic transmission and hydraulic accessory system respectively requires costly additional capital investment in the equipment and occupies valuable space in mobile machines where space is often times at a premium. Furthermore the fluid returned to the sump from the hydraulic transmission system in many cases is at a high temperature level, thereby requiring an oil cooler in the circuit which requires additional cost and space. In addition, the highly variable loads placed upon the accessory system pump, coupled with that pump's need to draw fluid directly from the sump at variable speeds corresponding to those of the engine which drives the pump, in many cases causes the pump to cavitate by virtue of its inability to draw a sufficient volumetric flow of fluid at high pump speed.

SUMMARY OF THE PRESENT INVENTION

The present invention solves all of the afore-mentioned drawbacks of the above-described conventional vehicular hydraulic systems by coupling the intake of the accessory system pump directly to the exhaust of one or more hydraulic transmission pump assemblies such that the hydraulic transmission pump assembly supercharges the accessory system pump. Such connection completely eliminates the need for separate filters, sump lines and sump return lines for the accessory system and hydraulic transmission system respectively, and effectively prevents any possibility of cavitation of the accessory pump even at high speed because the intake fluid delivered thereto is delivered at a substantial pressure developed by the hydraulic transmission pump assembly. Ideally the intake of the accessory system pump is connected to the exhaust of the hydraulic transmission charge pump or pumps such that the flow of such fluid through the accessory system provides the additional advantage of cooling the fluid from the high temperature developed in the hydraulic transmission, thereby also eliminating the need for an oil cooler. Such cooling by the accessory system is made possible primarily by the fact that the fluid conduits and hydraulic cylinders in the accessory system downstream of the accessory pump normally have a considerable length exposed to the outside air or in contact with the metal of the machine, so that considerable heat loss by conduction, convection and radiation is possible.

An additional advantage of such connection is that the parasitic power loss from the engine to the accessory system pump is diminished due to the fact that the pump receives its intake fluid at an elevated pressure developed by the hydraulic transmission pump assembly, thereby decreasing the power required to raise the pressure of the fluid to that required to operate the accessories.

The foregoing and other objectives, features and advantages of the present invention will be more readily understood upon consideration of the following detailed description of the invention taken in conjunction with the accompanying drawing.

BRIEF DESCRIPTION OF THE DRAWING

The single FIGURE is a schematic diagram of an illustrative embodiment of a combined vehicular hydraulic transmission system and hydraulic accessory system connected to one another in accordance with the present invention.

DESCRIPTION OF THE PREFERRED EMBODIMENT

With reference to the figure, the hydraulic transmission system is shown comprising a pair of hydraulic transmission pump assemblies 10 and 12, each having a variable displacement reversible pump 14, 16 respectively and a fixed displacement charge pump 18, 20 respectively drivingly coupled to the vehicle engine 21. Each variable displacement pump 14, 16 drives a reversible fixed displacement hydrostatic motor 22, 24 respectively through a closed loop recirculating hydraulic circuit 26, 28 respectively. Each motor 22, 24 drives a ground-engaging traction apparatus such as a wheel or track assembly as the case may be (not shown). The motors 22, 24 have conventional case drains 23, 25 respectively.

The charge pumps 18 and 20, which are part of the transmission pump assemblies 10 and 12 respectively, each receive hydraulic fluid from a central hydraulic reservoir 30 through a sump line 32 and filter 34. The charge pumps discharged a portion of their volumetric output into the closed loop 26, 28 only to the extent which is necessary to make up leakage in the closed loop. This keeps the loops completely filled with fluid so as to prevent cavitation of the variable displacement pumps aand motors. The excess volumetric flows of the charge pumps 18 and 20 are discharged through case drains 36, 38. Conventionally these drains would be connected only to the central reservoir 30. However, according to the present invention, the drains 36 and 38 are connected to the intake of a separate accessory system pump 40 driven by the same engine 21. The pump 40 discharges to the accessory system of the vehicle which may include one or more control valves 42 and one or more hydraulic accessory motors such as cylinder 44. Return of the fluid to the sump 30 from the accessory system is accomplished through a sump return line 46.

In operation, the hydraulic transmission system draws its fluid from the sump 30 through a single common sump line 32 and filter 34 and discharges sufficient excess fluid through drains 36 and 38 to satisfy the volumetric requirements of the accessory system pump 40. The combined volumetric flows through drains 36 and 38 must at least equal the volumetric demands of the pump 40, and will preferably exceed such demands at any given engine speed, in which case any excess flow is shunted to the sump 30. The shunting may be accomplished in any number of ways, for example by a drain line 48 having a standard flow divider valve (not shown) or restriction (as shown) for maintaining a pressure differential between the drains 36, 38 and the sump return line 46 to insure priority flow to the accessory pump 40 or, alternatively, by a separate sump return line 50 returning fluid to a reservoir 30 so elevated with respect to the drains 36, 38 and intake of pump 40 as to establish a static pressure head against the return of fluid through line 50, thereby insuring continuous positive (i.e. superatmospheric) pressure at the intake of the accessory pump 40. Increased speed of the engine producing increased volumetric flow through the pump 40 will be reflected by corresponding increases in flow from the charge pumps 18 and 20, since both are driven by the same engine.

During periods when no accessories are being operated, the output from the pump 40 is merely circulated through the open-centered control valve 42 and back to the sump 30 through the sump return line 46. Upon actuation of the accessory or accessories, the flow is diverted by the valve 42 to the appropriate hydraulic cylinder or motor.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a vehicle having an engine and a ground-engaging traction apparatus driven by said engine for moving said vehicle over the ground, the combination which comprises:
   a. a hydraulic fluid reservoir mounted on said vehicle;
   b. hydraulic transmission means mounted on said vehicle comprising hydraulic transmission motor means for driving said traction apparatus and hydraulic transmission pump means driven by said engine and hydraulically coupled with said transmission motor means for driving sayd transmission motor means, said transmission pump means having a sump line for receiving hydraulic fluid from said reservoir and discharge means for discharging hydraulic fluid from said transmission pump means;
   c. a hydraulically-powered accessory system mounted on said vehicle comprising a hydraulic accessory pump separate from said transmission pump means and driven by said engine, and a hydraulically-powered accessory driven by the discharge from said accessory pump, the intake of said accessory pump being operatively coupled to said discharge means of said transmission pump means so as to receive said hydraulic fluid therefrom;
   d. shunt means, operatively coupled to said discharge means of said transmission pump means in parallel relation to said intake of said accessory pump, connecting said discharge means to said reservoir for shunting to said reservoir hydraulic fluid discharged from said discharge means in excess of that received by said accessory pump; and
   e. means associated with said shunt means for maintaining a superatmospheric pressure of said fluid at said intake of said accessory pump during operation of said accessory pump, said superatmospheric pressure being greater than the fluid pressure in said reservoir during said operation.

2. The apparatus of claim 1 wherein said shunt means includes means defining a predetermined hydraulic restriction, interposed between said reservoir and the location where said intake of said accessory pump is coupled to said discharge means, for maintaining said superatmospheric pressure at said intake of said accessory pump.

3. The apparatus of claim 1 wherein said reservoir and shunt means are so elevated with respect to said discharge means and said intake of said accessory pump as to establish a static pressure head against the passage of said fluid through said shunt means to said reservoir so as to thereby maintain said superatmospheric pressure at said intake of said accessory pump.

* * * * *

UNITED STATES PATENT AND TRADEMARK OFFICE
CERTIFICATE OF CORRECTION

PATENT NO. : 4,033,127
DATED : July 5, 1977
INVENTOR(S) : Jacob Amstutz and Paul G. Amstutz It is certified that error appears in the above-identified patent and that said Letters Patent are hereby corrected as shown below:

In the Title:  Change "POWDERED" to --POWERED--.

Col. 1,  line 2    Change "POWDERED" to --POWERED--.

Col. 4,  line 13   Change "sayd" to --said--.

Signed and Sealed this

Thirty-first Day of January 1978

[SEAL]

Attest:

RUTH C. MASON
*Attesting Officer*

LUTRELLE F. PARKER
*Acting Commissioner of Patents and Trademarks*